(12) United States Patent
Kukkonen et al.

(10) Patent No.: US 8,591,737 B2
(45) Date of Patent: Nov. 26, 2013

(54) WASTE WATER TREATMENT FROM A BIOMASS-TO-LIQUID PROCESS COMPRISING SYNTHESIS GAS PRODUCTION AND INTEGRATED FACTORY FACILITY

(75) Inventors: Petri Kukkonen, Helsinki (FI); Pekka Knuuttila, Porvoo (FI); Pekka Jokela, Espoo (FI)

(73) Assignee: UPM-Kymmene Oyj, Helsinki (FI)

( * ) Notice: Subject to any disclaimer, the term of this patent is extended or adjusted under 35 U.S.C. 154(b) by 460 days.

(21) Appl. No.: 12/742,229

(22) PCT Filed: Jul. 18, 2008

(86) PCT No.: PCT/EP2008/059439
§ 371 (c)(1),
(2), (4) Date: Aug. 20, 2010

(87) PCT Pub. No.: WO2009/059819
PCT Pub. Date: May 14, 2009

(65) Prior Publication Data
US 2010/0317749 A1    Dec. 16, 2010

(30) Foreign Application Priority Data
Nov. 9, 2007 (FI) .................................... 20075794
Apr. 30, 2008 (FI) .................................... 20085400

(51) Int. Cl.
C02F 9/00 (2006.01)
C02F 1/42 (2006.01)
C02F 1/72 (2006.01)

(52) U.S. Cl.
USPC ........... 210/260; 210/660; 210/758; 210/928; 210/259; 210/919; 210/195.1; 210/600; 210/601; 210/634; 210/767

(58) Field of Classification Search
USPC .............. 210/195.1, 259, 260, 600, 601, 634, 210/660, 767, 919, 928
See application file for complete search history.

(56) References Cited

U.S. PATENT DOCUMENTS

| 6,533,945 B2 * | 3/2003 | Shah .............................. 210/765 |
| 2001/0045397 A1 | 11/2001 | Shah |
| 2004/0134395 A1 | 7/2004 | Eberhardt et al. |

FOREIGN PATENT DOCUMENTS

| WO | WO 03/022959 | 3/2003 |
| WO | WO 03/106351 | 12/2003 |

OTHER PUBLICATIONS

Biopact team, Chemrec and Newpage team up to produce biofuels from black liquor gasification, 2007, Biopact, Mongabay news, 1 page (Relates to Ref. C2 on IDS of Oct. 7, 2010).*

(Continued)

*Primary Examiner* — Yate K Cutliff
(74) *Attorney, Agent, or Firm* — Steptoe & Johnson LLP

(57) ABSTRACT

Treatment of waste water from a biomass-to-liquid process, said process comprising producing synthesis gas from biomass and conversion of said synthesis gas into liquid hydrocarbons by a Fisher-Tropsch process. The waste waters obtained are purified in common with waste waters from another industrial process to which said biomass-to-liquid process is integrated, such as in forestry, power and/or heat generation, waste incineration or a process in a metal-, petrochemical and/or oil refining industry. The biomass-to-liquid. process and said another industrial process may have a common feed water process unit, a common cooling water process unit and a common waste water treatment unit. The waste water treatment process may comprise a biological purification process and said Fischer-Tropsch process may utilize a cobalt catalyst. An integrated factory comprising a biomass-to-liquid plant and another industrial facility in which both plants are connected to a common waste water treatment facility is also described.

16 Claims, 2 Drawing Sheets

(56) References Cited

OTHER PUBLICATIONS

Cantrell, et al., "Role of Thermochemical Conversion in Livestock Waste-to-Energy Treatments: Obstacles and Opportunities," Ind. Eng. Chem. Res. [Online] vol. 46, No. 26,pp. 8918-8927, Jan. 11, 2007 XP002503370, Retrieved from Internet: http://ddr.nal.usda.gov/bitstream/10113/19185/1/IND44102915.pdf, retrieved on Oct. 5, 2010.

"Chemrec and NewPage team up to produce biofuels from black liquor gasification," BIOPACT, [Online] Aug. 27, 2007, pp. 1-3, XP002503346, Retrieved from Internet: http://news.mongabay.com/bioenergy/2007/08/chemrec-and-newpage-team-up-to-produce.html, retrieved on Oct. 5, 2010.

International Search Report for PCT/EP2008/059439 filed on Jul. 18, 2008, mailed on Nov. 26, 2008.

* cited by examiner

WASTE WATER TREATMENT FROM A BIOMASS-TO-LIQUID PROCESS COMPRISING SYNTHESIS GAS PRODUCTION AND INTEGRATED FACTORY FACILITY

This application claims priority under 35 USC 371 to International Application No. PCT/EP2008/059439, filed on Jul. 18, 2008, which claims priority to Finland Application Serial No. 20075794, filed Nov. 9, 2007, which claims priority to Finland Application Serial No. 20085400, filed Apr. 30, 2008, each of which is incorporated by reference in its entirety.

FIELD OF THE INVENTION

The present invention relates to a waste water treatment process for treating waste waters produced in a biomass-to-liquid process in a common waste water treatment process with waste waters produced in another industrial process. The invention also relates to a process for integrating a biomass-to-liquid process with another process, preferably a forest industry process such as a process for producing pulp and/or paper, wherein said biomass-to-liquid process comprises a process for producing synthesis gas from biomass and a Fischer-Tropsch process for converting said synthesis gas into liquid hydrocarbons, where the integration includes purifying the waste waters produced in the biomass-to-liquid process and in the other process in a common waste water treatment process. Furthermore, the invention relates to an integrated factory wherein at least a part of the water treatment facilities of a biomass-to-liquid plant and another process such as a forest industry process, power and/or heat generation process, waste incineration process or a process in metal-, petrochemical and/or oil refining industry is in common so that units producing said waste water in both plants and/or processes are connected to a common waste water treatment facility.

BACKGROUND OF THE INVENTION

The diminishing reserves of fossil fuels and the emission of harmful gases connected with their use have increased the interest in utilizing biological materials, especially from non-edible renewable resources for making liquid fuels capable of replacing fossil ones. Several prior art processes are known for producing liquid fuels from biological starting materials. However, effective utilization of materials and energy is crucially important for the economy of biomass-to-liquid fuels processes.

Biomass-to-liquid (BTL) facilities are typically composed of the following main units; modules for biomass pre-processing, gasification, synthesis gas purification, Fischer-Tropsch (FT) unit, wax cracking-isomerization, product separation, gas circulation and oxygen production.

Synthesis gas from both renewable and fossil sources has been used to produce liquid fuels by the Fischer-Tropsch synthesis. US 2007/0225383 discloses a process for converting biomass to synthesis gas and providing a Fischer-Tropsch reaction for reacting the gas into fuels and chemicals. The invention improves the energy balance of the reaction by utilizing the heat of the exothermic Fischer-Tropsch reaction in the endothermic gasification reaction.

It is well known that biomass-to-liquid is a combination of exothermic (e.g. Fischer-Tropsch, gasification) and endothermic (e.g. biomass drying, product separations, gas purification) and thermo neutral (e.g. air separation unit, ASU) processes. A considerable amount of electricity is consumed in biomass-to-liquid by pressure swings and pumping intermediates and process coolants. The energy inventory of the whole biomass-to-liquid, electricity included, is however positive.

Different types of integrated processes, resulting in improved efficiency and in some cases lower utility costs are known from prior art. U.S. Pat. No. 5,624,964 describes integration of a steam reforming unit and a cogeneration power plant where a portion of compressed air from the power plant gas turbine air compressor is introduced to a combustor-regenerator of the steam reforming unit and where hot flue gas from the combustor-regenerator is fed back to the combustor of the cogenerating gas turbine power plant mixed with the remainder of the compressed air. Steam reforming is inter alia an integral component in Fischer-Tropsh processes and is traditionally carried out in multitubular fixed bed reactors which are heated on the outside in a furnace, e.g. by burning fuel such as methane and propane to supply heat for the reaction. In a cogeneration power plant, power is generated by burning fuel gas at moderate pressures to produce hot, pressurized gases which are then expanded and cooled to produce power and steam.

US 2004/0055716 discloses synthesis gas production in combination with the production of pulp and paper where a recovery boiler for chemical recovery is replaced with a Black Liquor Gasification Combined Cycle (BLGCC) which increases the energy yield in the pulp mill and where the synthesis gas production is more energy efficient and the produced synthesis gas is more suitable for methanol production. The combination of the processes makes the use of lower grade energy resources, like forestry waste wood possible. U.S. Pat. No. 6,180,684 discloses an integrated plant for preparation of synthetic fuel from hydrocarbonous gas and production of mechanical and electrical power in a gas turbine where warm exhaust gas from the gas turbine is used to prewarm the starting material, mechanical or electrical power is used for operation of machinery in the integrated plant and power is moreover exported for other purposes.

Prior art also describes the integration of a biorefinery and a pulp and paper mill where the process steam and hot water from a Fischer-Tropsch process is used by a paper mill replacing steam and hot water made through the burning of natural gas. The tail gas of the Fischer-Tropsch process is used to replace natural gas in the lime kiln. Moreover electricity is exported from the biorefinery to the mill and the chemical recovery boiler can be eliminated by processing the organics in the black liquor to syngas in the biorefinery and by recovering the cooking chemicals for reuse by the pulp mill. The syngas is cleaned-up and fed to the gas-to-liquid plant (The integrated forest biorefinery: the pathway to our bio-future, E. J. Connor, International chemical conference: efficiency and energy management, Quebec City, Canada, 29 May-1 Jun. 2007, pp 323-327).

Moreover, integration of a biomass-fired synthesis-gas process with integrated pulp and paper mills has been discussed. A combined heat and motor fuel plant (CHMF) located at the pulp and paper mill site benefits from the existing biomass-supply infrastructure of a mill. The synthesis-gas process provides fuel gas, preferably off-gases to the mill for final superheating of recovery-boiler steam, for fuelling the lime kiln or for fuelling gas-fired paper dryers. Black liquor from the mill can be partly gasified and in that case the hydrogen sulphide entering the main synthesis-gas processing line with the black-liquor-derived gas is removed in the gas-conditioning step and absorbed into the white liquor. A $CO_2$ rich stream from the synthesis-gas conditioning step is utilized as the acidulation agent in the lignin-removal process (Biomass conversions; Integrated Forest Biorefinery Concepts, K. Saviharju and P. McKeough, Pulp & Paper Conference 5-7 Jun. 2007, pp 5-10).

Moreover, different approaches for the use of synthesis gas, Fischer-Tropsch tail gases and/or methanol as peak-shaving fuel in power plants has been suggested in prior art. WO 2007/061616 describes multiple syngas compositions for variable coproduction of electrical power and chemicals where the volume and/or composition of the syngas required for each function may vary over time. WO 2007/076363 discloses integrating of a Fischer-Tropsch hydrocarbon production facility with an electrical power generating facility where the peak-load power demand can be met by reducing the temperature of the Fischer-Tropsch reactor thereby increasing the quantity of tail gases and using Fischer-Tropsch tail gases to fuel a gas turbine generator set, thus achieving constant flow rates in the synthesis gas generating units and the Fischer-Tropsch units. U.S. Pat. No. 4,946,477 discloses an improvement to the methanol production step within an integrated gasification combined cycle (IGCC) electric power plant process where the methanol is produced from CO-rich synthesis gas and is used for peak-shaving. The water-gas shift and the methanol synthesis reactions take place simultaneously in a liquid-phase methanol reactor.

However, although integration of biomass-to-liquid plants or parts thereof with other facilities has been suggested for energy and chemical recovery, there is still a need for more efficient biomass-to-liquid processes. There is also a need for further improving the integration of biomass-to-liquid process with other industrial processes.

The present invention relates to the synergies of common waste water treatment of a biomass-to-liquid plant and another industrial facility such as a forest industry process, a power plant, an incineration plant, metal works, petrochemical plant or oil refinery when a wide-ranging integration of the at least two plants and/or processes are performed. The preferred other industrial process is a process for producing pulp and/or paper.

SUMMARY OF THE INVENTION

The present invention relates to a waste water treatment process for treating waste waters produced in a biomass-to-liquid process in a common waste water treatment process with waste waters produced in another industrial process. Furthermore, the invention relates to an integrated factory wherein at least a part of the water treatment facilities of a biomass-to-liquid plant and another industrial facility such as a forest industry mill, power and/or heat generation plant, waste incineration process or a metal-, petrochemical and/or oil refining industry are in common so that units producing said waste water in both plants and/or facilities are connected to a common waste water treatment facility.

The invention also relates to a process for integrating a biomass-to-liquid process with another process, preferably a forest industry process such as a process for producing pulp and/or paper, wherein said biomass-to-liquid process comprises a process for producing synthesis gas from biomass and a Fischer-Tropsch process for converting said synthesis gas into liquid hydrocarbons, where the integration includes purifying the waste waters produced in the biomass-to-liquid process and in the other process in a common waste water treatment process.

One advantage of the common waste water treatment of the integrated biomass-to-liquid plant and other industrial facility and the waste water treatment process of the present invention is the possibility to use an alcohol-contaminated aqueous effluent, that is produced when the Fischer-Tropsch process utilizes a cobalt catalyst, in a biological purification of a waste water treatment process. The alcohol-contaminated effluent is provided to said biological purification in an amount which is effective in stabilizing and/or improving said purification process when the alcohol-contaminated effluent is diluted with an aqueous effluent from the other industrial process.

DETAILED DESCRIPTION OF THE INVENTION

Figure 1:
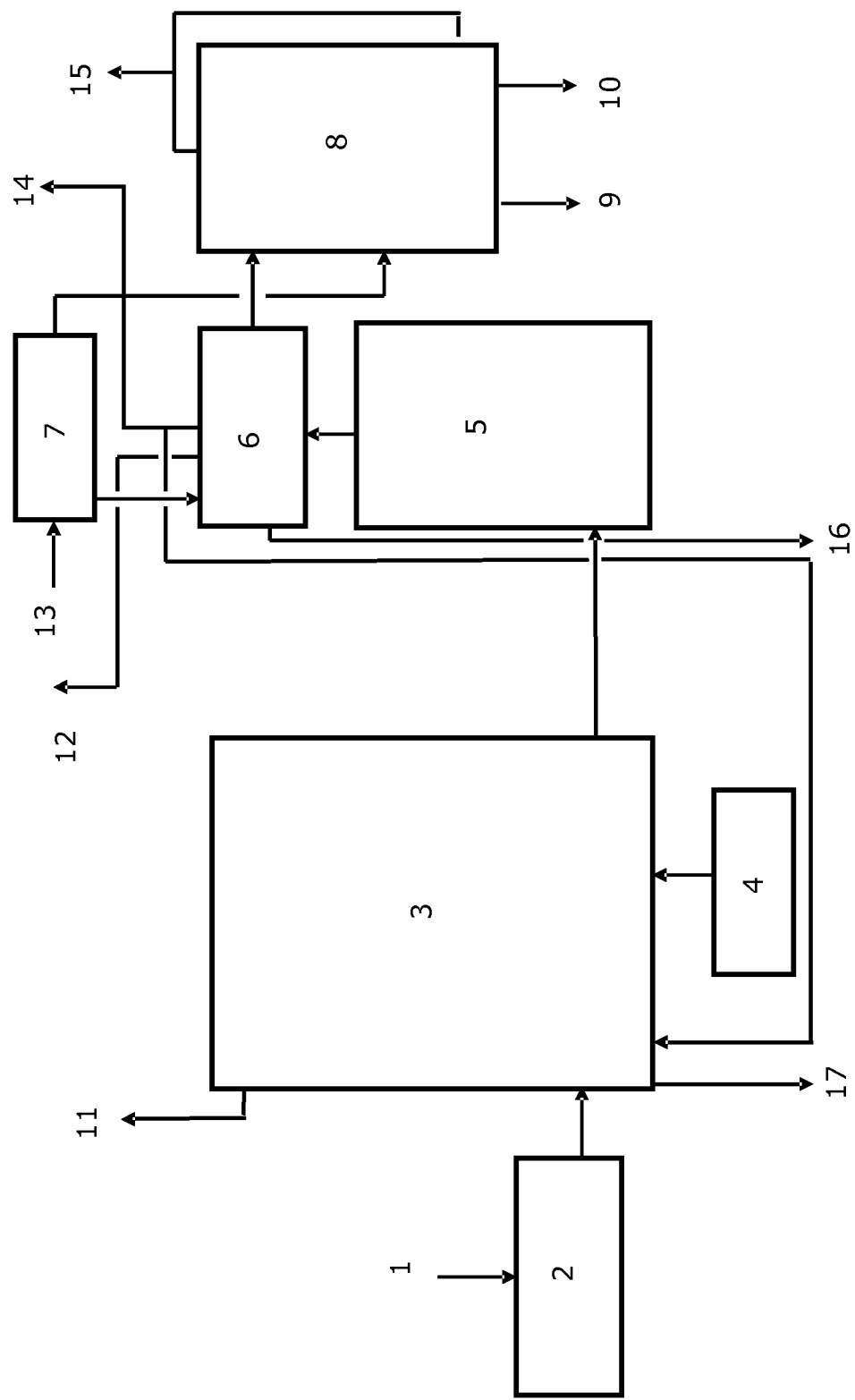
FIG. 1 is schematic flow diagram representing one example of a biomass-to-liquid process

The present invention relates to a waste water treatment process for treating waste waters produced in a biomass-to-liquid process in a common waste water treatment process with waste waters produced in another industrial process.

In the present specification and claims, the following terms have the meanings defined below.

An "integrated process" means a process wherein two or more related functions of at least two separate industrial processes, which can be separately performed, are combined so that at least one significant process step is common for the two processes.

An integrated factory or facility means a factory or facility where at least two industrial facilities have one or more industrial units in common.

The term "wastewater treatment" or "sewage treatment" means the process of removing contaminants from wastewater. It includes physical, chemical and biological processes to remove physical, chemical and biological contaminants. Its objective is to produce a liquid waste stream (or treated effluent) and a solid waste or sludge suitable for reuse or discharge into the environment. Waste water treatment typically involves three stages, called primary, secondary and tertiary treatment. First, the solids are separated from the wastewater stream. Then dissolved biological matter is progressively converted into a solid mass by using indigenous, water-borne microorganisms. Finally, the biological solids are neutralized, possibly disposed of or re-used, and further the treated water can be disinfected chemically or physically.

The term "synthesis gas" or "syngas" refers to a gas mixture that contains varying amounts of carbon monoxide and hydrogen generated by the gasification of a carbon containing substance. Gasification of biological materials provides a ratio of hydrogen to carbon monoxide, which is about 2. The gas is suitable for providing hydrocarbons by the Fischer-Tropsch synthesis especially after some additional hydrogen has been added. In addition to carbon monoxide and hydrogen "raw synthesis gas" which has not been purified may also comprise "impurities" such as $CO_2$ (carbon dioxide), $CH_4$ (methane), $H_2O$ (water), $N_2$, (nitrogen), $H_2S$ (hydrogen sulfide), $NH_3$ (ammonia), HCl (hydrogen chloride), tar, and small particles such as ash and soot. Typically conditioning of the raw synthesis gas is needed to obtain purified synthesis gas suitable for a Fischer-Tropsch type synthesis. Conditioning of the raw synthesis gas means for example that the purified synthesis gas has a molar ratio of hydrogen to carbon monoxide between 2.5 to 1 and 0.5 to 1, preferably to between 2.1 to 1 and 1.8 to 1, more preferably about 2 to 1.

The "Fischer-Tropsch" synthesis is a catalyzed chemical reaction in which hydrogen and carbon monoxide are converted to a substantially Gaussian distribution of hydrocarbon chains of various lengths (designated ($C_1$ to $C_{100+}$). Typical catalysts used are based on iron and cobalt. The term "Fischer-Tropsch conditions" refers to reaction conditions which are suitable for conducting a Fischer-Tropsch reaction. For producing diesel fuels the so called alfa-value (the alfa-value a value between 0 and 1 which is lowest for methane and highest for solid waxes) should be high and preferably close to 0.89, which is the maximum alfa-value for middle distillates. Such conditions are well known and documented in the art.

The term "autothermal reforming" refers to the catalytic production of hydrogen from feed stocks such as hydrocarbons and methanol by the combination of partial oxidation and steam reforming.

The term "water gas shift" refers to the inorganic chemical reaction in which water and carbon monoxide react to form carbon dioxide and hydrogen (water splitting).

The term "pulp and/or paper mill" or "pulp and/or paper process" or "pulp and/or paper facility" refers to a process or production facility, where either pulp from wood or non-wood raw material is produced and/or where paper from the pulp is produced. These terms also refer to separate pulp and paper producing facilities/mills.

As raw material for the FT process, almost any kind of biomass is suitable for being gasified. If needed, the biomass is first dried to bring its moisture content down to 35 w-% or less such as 10-20 w-%. The biomass is typically selected from virgin and waste materials of plant, animal and/or fish origin, such as municipal waste, industrial waste or by-products, agricultural waste or by-products (including also dung), waste or by-products of the wood-processing industry, waste or by-products of the food industry, marine plants (such as algae) and combinations thereof. The biomass material is preferably selected from non-edible resources such as non-edible wastes and non-edible plant materials, including oils, fats and waxes. A preferred biomass material according to the present invention comprises waste and by products of the wood-processing industry such as residue, urban wood waste, lumber waste, wood chips, sawdust, straw, firewood, wood materials, paper, by-products of the papermaking or timber processes, short rotation crops etc. The biomass material for the FT process may also comprise vegetable oils, animal fats, fish oils, natural waxes, and fatty acids.

The raw materials useful in the FT process of the invention come in various different forms and they may be subjected to suitable pre-handling processes in order to improve their utility in the integrated process of the invention. Thus, the material may be sorted, cleaned, washed, dried, ground, compacted, mixed, pre-hydrogenated, etc. in order to remove impurities and to provide a feed stream which is suitable for the synthesis gas production for the FT reaction.

The equipment to be used in the construction of the integrated biomass-to liquid process and factory typically comprises components which are known as such or may be modified from components known as such. The basic equipment required for the integrated biomass-to-liquids facility typically includes modules for biomass pre-processing, gasification, synthesis gas purification, Fischer-Tropsch reaction, wax cracking-isomerization, product separation, gas separation and circulation and oxygen production.

In a biomass-to-liquid process, process effluents are formed during gasification, gas purification, the Fischer-Tropsch process and in the product upgrade section. These effluent streams can be fed to a new common or to an existing waste water treatment plant locating adjacent to another industrial process and/or facility such as a pulp and/or paper mill.

The process effluent originating from the gasification is formed when the syngas is scrubbed with water. Water scrubbing is done to purify the syngas from particles, remaining heavy tars, light tars, ammonium, alkalimetals, chloride- and phosphorus compounds and all other water soluble compounds. A typical light tar compounds analyzed from scrubber liquid of the gasifier are shown in Table 1. The total organic carbon (TOC) content of the scrubber water is typically much lower than 1 g/dm$^3$. During water scrubbing the syngas is cooled down to about 50° C. The cooling of the syngas effluents leads to excess water forming into process effluent. The amount of gasification originated process effluent varies between 10 t/h to 40 t/h for a biomass-to liquid process producing about 110.000 t/a liquid fuels.

TABLE 1

|  | mg/dm$^3$ |
|---|---|
| Benzene | 3 |
| Water soluble compounds | 53 |
| Monocyclic aromatic hydro carbons | 0 |
| Naphthalene | 5 |
| Indene and PAH-compounds | 22 |
| Total tar | 83 |

When a cobalt catalyst is used for the Fischer-Tropsch synthesis, about 20-25 t/h of process effluent originates from the Fischer-Tropsch process as mainly alcohol contaminated water. Some effluent also derives from the product upgrade unit. The use of an iron based catalyst in the Fischer-Tropsch process results in process effluents only from the gas purification unit and the product upgrade unit. The amount of effluent is significantly smaller for the iron based catalyst process.

The total amount of biomass-to-liquid originated aqueous process effluents results in tens of metric tons per hour. Typically the capacity of the waste water treatment plant at a pulp and/or paper mill is in the range of thousands of metric tons per hour. The addition caused by the integrated BTL concept in the total waste water flow will be small. Further significant synergies are achieved since, especially alcohols, from the biomass-to-liquid originated process effluents stabilizes a biological waste water treatment process.

The most common ways to produce pulp for papermaking are by chemical or by mechanical pulping. In chemical pulping, the wood chips or lignocellulosic non-wood material are treated with heat and chemicals that cause the fibers of the material to separate and dissolves the lignin between the fibers. In mechanical pulping, the wood is ground into fibers mechanically. The obtained wood pulp (chemical or mechanical pulp) is washed and very often also bleached. If the pulp mill is connected to a paper mill, the pulp can be led straight from washing/bleaching to the stock preparation of the paper machine. If this is not possible, the pulp is dried and baled for later use. Pulp is also provided in bales for paper mills that have no pulp production of their own.

In paper mill, the stock preparation includes several stages. In stock preparation water and various additives are added to the stock to produce a pulp suspension that can be led to the headbox of the paper machine. In paper machine, the stock is fed through a headbox on a wire where a paper web is formed as a result of sucking off the water, pressing and drying. The dried web is then cut and rolled into a final product.

In chemical pulp mills, the chemicals used in the cooking are recovered in the chemical recovery cycle of the mill. In a Kraft pulping process the used cooking liquor, that is black liquor, is burned after an optional recovery of the tall oil portion thereof. In the recovery boiler the organic substances including hydrogen sulphide are decomposed. The sodium and sulfur containing smelt is dissolved and used to provide new cooking liquor. As can be realized from above, a pulp mill comprises a recovery boiler producing steam. The mill may also comprise a waste heat boiler for steam production also. Both of these boilers produce flue gases that must be cleaned before they are led to the environment. Scrubbers can be used for this purpose.

The pulping wastewaters are formed for example in wood handling, cooking (chemical pulping), grinding (mechanical pulping), washing, screening and bleaching. Also flue gas scrubbers produce waste waters. The waste waters contain chemicals dosed for digestion (chemical pulping) and organic materials separated from wood, such as lignin, sugar and hemicellulose. Due to the presence of these contaminants, the wastewater has a high biochemical oxygen demand (BOD), chemical oxygen demand (COD) and color. Pulping waste water can be treated by chemical coagulation, sedimentation and filtration processes. Ultrafiltration can be applied to treat bleaching wastewater in pulp mill. Wastewater from paper mill using virgin pulp, which is relatively less contaminated, can be discharged after being treated with coagulation-sedimentation or dissolved-air flotation. Lately, treated water has been reused after filtration.

Papermaking processes of today are designed with reduced water consumption in mind. Fresh water is used only in the most critical parts of the process, for example in paper machine showers and chemical dilution. Excess water from the paper machine is directed to the pulping process and to the effluent treatment through fiber recovery. Part of the water also evaporates especially in the paper machine dryer section.

Great benefits of the present integrated process are obtained when the other industrial process is a pulp and/or paper mill. Besides the great synergies of a common waste water treatment, waste and/or by-products of the pulp and/or paper mill are very efficiently utilized as raw materials for the BTL. At the same time, other wastes of the BTL process than water, such as hydrogen sulphide are efficiently handled in the traditional sulphur recirculation systems of the pulp and/or paper mill. Importantly also, steam from the gasification unit as well as from the Fischer-Tropsch reaction of the BTL process, can be used for power generation and/or unit operations of the pulp and paper mill, such as drying of the fibrous feed stock or drying of the paper. Moreover purified water from a common ion-exchange process can be used both in the paper and/or pulp mill as well as in the BTL process. Fuel gas (tail and/or off gases) from the Fischer-Tropsch of the BTL process can also be used in the pulp and/or paper mill for inter alia power generation.

In a preferred integrated biomass-to-liquid processing plant the equipment comprises means for feeding water produced in the biomass-to-liquid process reactor(s) to the waste water treatment unit of the pulp and/or paper mill. Means for feeding cooling water as well as purified feed water from a common ion exchange process to the biomass-to-liquid process is comprised as well. The equipment also comprises means for feeding energy produced in the pulp and paper mill to the biomass-to-liquid process and also means for feeding steam and energy produced in the Fischer-Tropsch reactor to for example a drying process of said pulp and paper mill. Means are also provided for feeding biomass such as wood-based waste of the pulp and/or paper mill to the synthesis gas production for the Fischer-Tropsch reactor and for feeding instrument air to the biomass-to-liquid process as well as $H_2S$ rich gas and fuel gas from the biomass-to-liquid process to the pulp and/or paper mill.

A substantial amount of water is used in both processes for cooling purposes and they can be led to a separate sewer for uncontaminated water. The present invention relates to a common use of this cooling water intake and discharge. Benefits are also provided by utilization of common units for providing purified process water to both processes.

An oil refinery is an industrial process plant where crude oil is processed and refined into more useful petroleum products, such as gasoline, diesel fuel, asphalt base, heating oil, kerosene, and liquefied petroleum gas. The wastewater collection and treating systems unit of an oil refinery can consist of oil-water separators, which are devices designed to separate gross amounts of oil and suspended solids from the wastewater effluents of oil refineries, dissolved air flotation (DAF) units and some type of further treatment, such as an activated sludge biotreater, to make such water suitable for reuse or for disposal. One of the products obtained from oil refineries are petrochemicals or petrochemical feedstock, which are often sent to petrochemical plants for further processing in a variety of ways. The petrochemicals may be olefins or their precursors, or various types of aromatic petrochemicals. Waste water from petrochemical plants are treated by various means depending on the contaminant. A part of the effluents are typically treated in biological waste water purification facilities which are suitable also for treating the BTL effluents.

Incineration is a waste treatment technology that involves the combustion of organic materials and/or substances. Incineration and other high temperature waste treatment systems are described as "thermal treatment". Incineration of waste materials converts the waste into incinerator bottom ash, flue gases, particulates, and heat, which can in turn be used to generate electric power. There are various types of incinerator plant design, for example moving grate, fixed grate, rotary-kiln and fluidised bed. Modern incinerators include pollution reducing equipment such as flue gas cleaning equipment. The flue gases can be cleaned for example by scrubbing them with an acid and/or basic scrubbing liquid as well as with means for removal of particles and other impurities. The waste water from the scrubbers must subsequently pass through a waste water treatment plant which can be integrated with a biomass-to-liquid plant according to the present invention.

Various processes for treating waste water is used in metal industry, such as iron, steel or aluminum industry and/or in mine industry, such as a coal pit. Especially waste water from various scrubbers can be treated in the same ways as the waste water from the BTL process. If iron catalyst is used in the Fischer-Tropsch process additional synergies can be found if the BTL process is integrated with an iron industry industrial facility and new catalyst thus can be obtained from the iron production facility. Other benefits of the integration of a BTL process with metal and/or mining industrial facilities are that gases from the metal production or for example coal pit can be used as feed stock for the Fischer-Tropsch unit of the BTL process.

The present invention relates to a process for integrating a biomass-to-liquid process with another industrial process, wherein the integration comprises purifying the waste waters produced in said biomass-to-liquid process and in the other industrial process in a common waste water treatment process. The biomass-to-liquid process comprises a process for producing synthesis gas from biomass in a gasification and gas conditioning unit and a Fisher Tropsch process for converting said synthesis gas into liquid hydrocarbons. Typically the other industrial process is a power and/or heat generation process, waste incineration process, a process in a metal-, petrochemical and/or oil refining industry or a forest industry process, most preferably a process for producing pulp and paper.

The present invention further relates to a waste water treatment process for treating waste waters formed in a biomass-to-liquid process wherein the waste waters produced in a biomass-to-liquid process are purified in a common waste water treatment facility with waste waters produced in another industrial process, to which the biomass-to liquid process is integrated. The biomass-to-liquid process comprises a process for producing synthesis gas from biomass of wood-based by-products of said pulp and/or paper process and a Fisher Tropsch process for converting said synthesis gas into liquid hydrocarbons. Typically the other industrial process is a power and/or heat generation process, waste incineration process, a process in a metal-, petrochemical and/or oil refining industry or a forest industry process, preferably a process for producing pulp and/or paper, most preferably a process for producing pulp and paper.

Examples of suitable biomass sources include forest residue, urban wood waste, by-products and waste of the papermaking industry, lumber waste, wood chips, sawdust, straw, firewood, agricultural residue, dung, waste from trade and industry and the like. Also short rotation crops, e.g. willow, poplar, robinia, eucalyptus and lignocellulosic crops e.g. reed canary grass, Miscanthus and switchgrass are suitable biomass.

In a preferred embodiment of the invention the common waste water treatment process comprises a biological purification process and said Fischer-Tropsch process utilizes a cobalt catalyst which provides an alcohol-contaminated aqueous effluent, and wherein said alcohol-contaminated effluent is diluted with an aqueous effluent from said pulp and/or paper process for said biological purification process. Typically the alcohol-contaminated effluent contains 0.25-5 w-% alcohols and preferably the alcohol in the effluent is provided to the biological purification process in an amount which is effective in stabilizing and/or improving said purification process.

In another preferred embodiment of the invention the biomass-to-liquid process and the other industrial process has, besides the common waste water treatment process, a common feed water process unit and a common cooling water process unit, thus having an comprehensive integrated water treatment system.

The production of synthesis gas may include scrubbing and/or quenching of the synthesis gas with water to remove contaminants and/or to cool the synthesis gas, and the resulting contaminated water can be purified in the common waste water treatment process of the invention. Typically the contaminated water contains water-insoluble and water-soluble contaminants, including heavy or light tars, ammonium, alkali metals, chloride compounds, phosphorus compounds, as well as condensed water vapour.

In a preferred embodiment of the invention pure water required in the biomass-to-liquid process and in the other industrial process, respectively, is provided in a common ion exchange process. Typically the pure water is used for providing steam for each of said integrated process. Preferably the biomass-to-liquid process includes a water gas shift (WGS) reaction and chemically pure water is provided to the WGS reaction from the common ion exchange process. Chemically pure water may further be provided to a gasification unit and to an autothermal reformer of the biomass-to-liquid process.

A solid residue containing elemental carbon, soot and/or char may be produced as a by-product of the gasification of the biomass-to-liquid process. Typically the solid residue or the elemental carbon or a part thereof is used for purifying a contaminated liquid and/or gaseous effluent of the biomass-to-liquid process or the other industrial process, preferably a pulp and/or paper process.

Usually the energy value of the solid residue/elemental carbon is increased by the purification process and it may be mixed with combustible by-products of the other industrial, preferably a pulp and/or paper process for improving the combustion value of the combustible by-products. The solid residue may also be used for providing activated carbon. The activated carbon obtained by further processing of the solid residue/elemental carbon may be used in an active carbon filter.

In one preferred embodiment of the invention high, medium and/or low pressure steam provided in the biomass-to-liquid process is utilized as high, medium and/or low pressure steam, respectively, in the other industrial process, preferably in a pulp and/or paper process.

Typically the hydrocarbons produced in the Fischer-Tropsch process are subjected to wax cracking isomerization and the resulting product is separated into gaseous off gas and liquid fuel products. The gaseous off gas or part thereof is preferably directed to the other industrial process for combustion and energy production.

Adjusting of the process parameters of the Fischer-Tropsch process leads to different amounts of products, such as gaseous off gas and liquid fuel products. If for example more off gases are needed for energy production in the other industrial process, the process parameters of the Fischer-Tropsch process are adjusted to allow forming of more off gases and less liquid fuel products. Thus, the amounts of products directed from the Fischer-Tropsch process to the other industrial process and/or to the common waste water treatment may be adjusted by adjusting the parameters of said Fischer-Tropsch process. How the Fischer-Tropsch process can be adjusted is inter alia described in the book Steynberg A. and Dry M., Fischer-Tropsch Technology, Elsevier 2004, p. 601-680.

In a preferred embodiment of the invention the pulp and/or paper process is operated to produce pulp and/or paper and the biomass-to-liquid process is operated to produce biofuel in the diesel and/or naphtha boiling range and the integrated process is optionally operated to provide surplus energy and/or chemicals.

The present invention also relates to an integrated factory comprising a biomass-to-liquid plant and another industrial facility, wherein the biomass-to-liquid plant and the other plant have at least a part of their water treatment facilities in common so that units producing aqueous effluents in said plant and in said mill, respectively, are connected to a common waste water treatment facility. The biomass-to-liquid plant comprises a gasification and gas conditioning unit for synthesis gas production capable of producing synthesis gas from biomass, and a Fischer-Tropsch synthesis unit capable of converting said synthesis gas into liquid hydrocarbons. Typically the other facility is a power plant, incineration plant, metal works, petrochemical plant, oil refinery or a forest industry mill, preferably a pulp and/or paper mill, most preferably a pulp and paper mill.

In a preferred embodiment of the invention the common waste water treatment facility comprises a biological water purification facility suitable for the purification of aqueous effluents of said pulp and/or paper mill. The Fischer-Tropsch unit may further comprise a cobalt catalyst providing alcohol-contaminated water suitable for biological waste water purification.

In a further preferred embodiment of the invention the biomass-to-liquid plant comprises a synthesis gas purification unit, i.e. a gasification and gas conditioning unit having a scrubber and/or quenching unit providing contaminated water suitable for biological waste water purification.

The integrated biomass-to-liquid plant and other industrial facility, which preferably is a pulp and/or paper mill, may have a common ion exchange unit for providing pure water. Typically the biomass-to-liquid plant includes a water gas shift (WGS) unit utilizing water from the common ion exchange unit.

The biomass-to-liquid plant of the integrated factory may further comprise an absorption unit comprising elemental carbon produced in said gasification unit and typically the biomass-to-liquid plant comprises means for producing high, medium and/or low pressure steam and the other industrial facility, which preferably is a pulp and/or paper mill, also comprises means for utilizing said high, medium and/or low pressure steam.

The following example is given to further illustrate the invention and is not intended to limit the scope thereof. Based on the above description a person skilled in the art will be able to modify the invention in many ways to provide integration of two or more processes having common waste water treatment. The at least two industrial facilities which are integrated can be integrated at different levels where the total amount of industrial units which are integrated is one or more.

Example 1

FIG. 1 shows a schematic flow diagram of a biomass-to-liquid (BTL) process located in close connection to and integrated with a pulp and paper mill. The biomass-to-liquid process comprises feeding of forest residue 1 to a feed stock pretreatment unit 2 where after the feed stock is led to a gasification and gas conditioning unit 3 for synthesis gas production. The gasification and gas conditioning unit 3 includes i.a. scrubbing of the gas and a water gas shift (WGS) unit. The unit 3 is connected to an air separation unit (ASU) 4 for production of oxygen. Before the Fischer-Tropsch synthesis unit 6, the gas is treated in a gas processing and clean up unit 5.

Hydrogen is produced in an autothermal reforming (ATR) unit 7 from a feed stream 13 comprising tail gases 14 and off-gases 15 from the process. The hydrogen is separated out in a pressure swing adsorption (PSA) unit 7 or a like. Hydrogen from other parts of the process may also be used.

Naphtha 9 and diesel 10 fractions are obtained from the product gas of the Fischer-Tropsch synthesis unit 6 in the product upgrade unit 8. High pressure steam (hp-steam) 11 is obtained from the gasification and gas conditioning unit 3 and middle pressure steam (mp-steam) 12 is obtained from the Fischer-Tropsch synthesis unit 6. Fischer-Tropsch tail gases 14 and off-gases 15 are further removed from the Fischer-Tropsch synthesis unit 6 and product upgrade unit 8, respectively. Aqueous effluents 16 and 17 are obtained from the Fischer-Tropsch synthesis unit 6 and from the gasification and gas conditioning unit 3, respectively.

Figure 2:
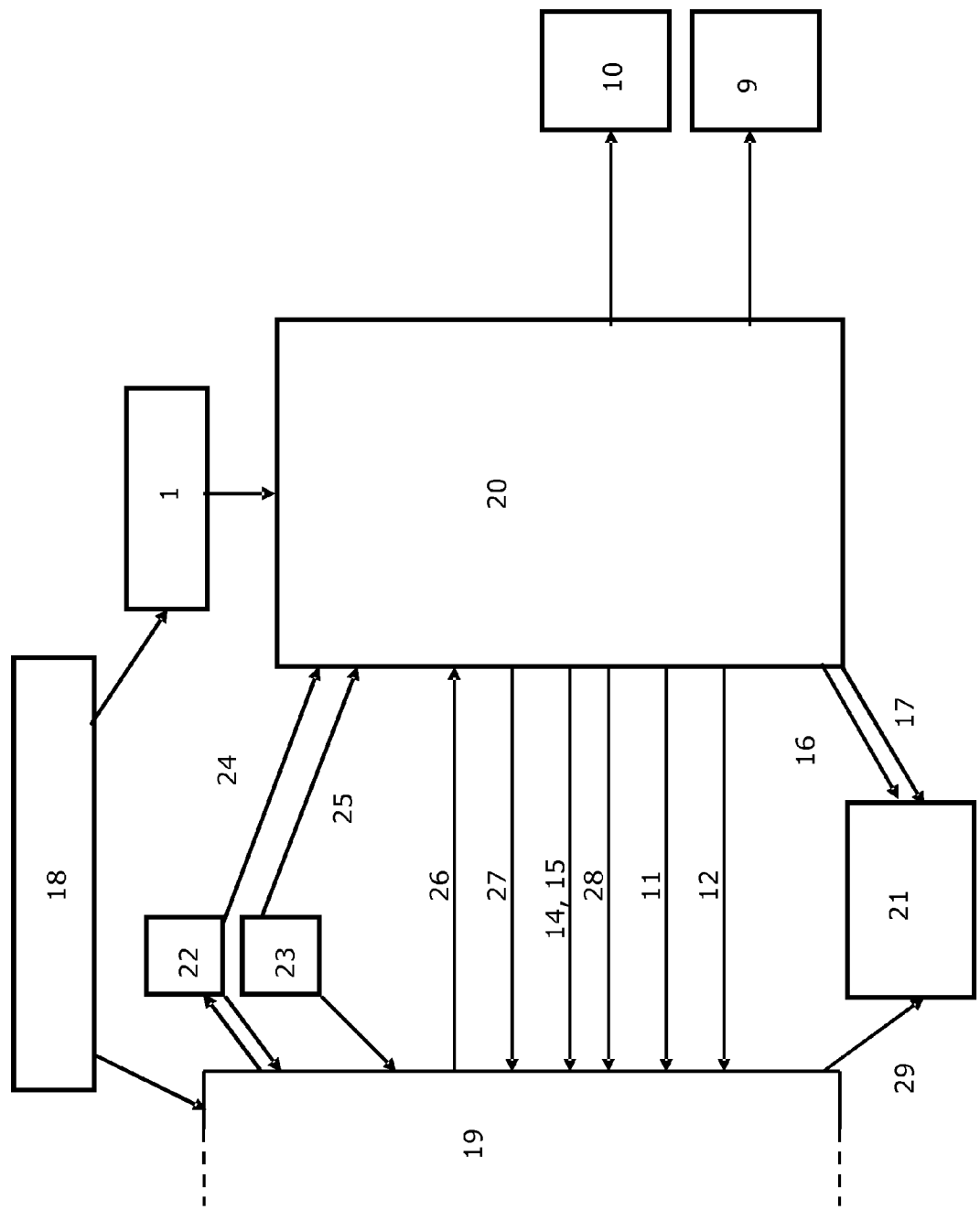
FIG. 2 is schematic flow diagram representing an embodiment of the invention

FIG. 2 shows an example of a BTL biodiesel facility 20 as described above. In this example about 2.1 TWh/a (terawatt hours/annum) or about 1 Mio m³/a (millions of cubic meter/annum) of energy wood (mainly forest residue) 1 from a common wood logistics facility 18 is fed to the biomass-to-liquid process integrated with a pulp and paper mill 19. The BTL process produces 65.000-88.000 t/a (metric ton/annum) of diesel and 20.000-27.000 t/a of naphtha. The pulp and paper mill 19 produces about 600.000-700.000 t/a pulp and/or paper.

Cooling water 25 having a cooling capacity of 30-60 MW is fed from the mill water system 23, to the gasification and gas conditioning unit 3 for cooling of the produced syngas, to the Fischer-Tropsch synthesis unit 6 and to the air separation unit 4 of the BTL biodiesel facility 20. Further 120-150 t/h (35-40 kg/s) 24 of purified feed water from an ion-exchange process 22, which is common for the pulp and paper mill 19 and the BTL biodiesel facility 20, is fed to inter alia a WGS reaction of the BTL biodiesel facility 20. The WGS produces hydrogen from carbon monoxide and water. Purified feed water is also used to provide steam for the process, for example for gasification of biomass, for the gas conditioning and/or for indirect cooling of tail gases.

The mp pure water condensate (20 kg/s) 28 obtained from the indirect cooling of the Fischer-Tropsch process of the BTL biodiesel facility 20 may be used as such in the pulp and paper mill 19. At the same time 20-30 MW of electric power 26 produced in connection to the pulp and paper mill 19 is used in the BTL biodiesel facility 20.

Moreover the steam obtained in the BTL biodiesel facility 20, 10-25 kg/s of hp-steam 11 and 0-10 kg/s of mp-steam 12 is directly useful as such in the pulp and paper mill 19. The hp-steam 11 is used for power generation and the mp-steam 12 may be used for drying of the pulp and/or paper web. The mp-steam 12 may also be used, at least partly, within the BTL biodiesel facility 20 in gasification, gas conditioning and/or in the WGS.

A cobalt catalyst is used in the Fischer-Tropsch synthesis and, consequently, alcohol-contaminated water, 20-25 t/h effluent 16 is produced in the Fischer-Tropsch synthesis unit 6. This contaminated water cannot be recirculated in the process and the effluent has to be processed in a special purification process. However, after dilution, the contaminated water can be treated in a biological waste water purification process of the waste water treatment process unit 21. Using the diluted alcohol-containing effluent in the biological waste water purification process in fact stabilizes and improves the purification process.

An aqueous effluent 25-30 t/h, that is, waste water, is also produced in the scrubbers of the gasification and gas conditioning unit 3 and in the product upgrade unit 8 of the BTL biodiesel facility 20. When syngas is scrubbed with water in the gasification and gas conditioning unit 3, there forms process effluent. During water scrubbing the syngas is cooled down to 50° C.

Also other wastes of the BTL biodiesel facility 20 than water can be efficiently handled in the pulp and paper mill 19. Hydrogen sulphide, 3 kg/s 27, is handled in the traditional sulphur recirculation systems of the pulp and/or paper mill 19.

In the process described, the amount of aqueous effluent purified in the biological purification process of the waste water treatment process unit 21, of the close-by pulp and paper mill 19, is typically 45-55 t/h in total and its typical composition is shown below in Table 2.

TABLE 2

| Effluent | Quantity | Characteristics |
|---|---|---|
| Waste water | 20.6 t/h | Alcohols<br>MEOH 0.26 vol %<br>ETOH 0.1 vol % |

TABLE 2-continued

| Effluent | Quantity | Characteristics |
|---|---|---|
| | | PROH 0.03 vol % |
| | | BUOH 0.02 vol % |
| | | C5OH < 0.01 vol % |
| | | C6OH < 0.01 vol % |
| | | C7+OH < 0.01 vol % |

At the same time, the pulp and paper mill 19 produces approximately 2000-5000 t/h contaminated water (effluent) 29 from its various process steps. Thus, both the BTL biodiesel facility 20 and the pulp and paper mill 19 produce contaminated water as an undesired by-product of the processes. According to the invention, the water streams are merged and purified in a common waste water facility. In the present example, the waste water is treated in a biological purification process, and the waste water from the BTL biodiesel facility 20 is first diluted with the water from the pulp and paper mill and thereafter fed to the water purification.

The invention claimed is:

1. A waste water treatment process for treating waste waters produced in a biomass-to-liquid process which biomass-to-liquid process comprises
a process for producing synthesis gas from biomass,
a Fisher Tropsch process utilizing a cobalt catalyst for converting said synthesis gas into liquid hydrocarbons,
characterized in that said waste waters comprising an alcohol-contaminated aqueous effluent produced in said biomass-to-liquid-process are purified in a common waste water treatment process comprising a biological purification process with waste waters produced in a process for producing pulp and/or paper to which said biomass-to-liquid process is integrated, wherein said alcohol-contaminated effluent is diluted with an aqueous effluent from said process for producing pulp and/or paper for said biological purification process, and said alcohol in said effluent is provided in an amount which is effective in stabilizing and/or improving said purification process.

2. The process according to claim 1, wherein said biomass-to-liquid process and said process for producing pulp an/or paper has a common feed water process unit, a common cooling water process unit and said common waste water treatment unit.

3. The process according to claim 1, wherein said biomass comprises forest residue, urban wood waste, by-products and waste of a forest industry, lumber waste, wood chips, sawdust, short rotation crops, straw, firewood, agricultural residue, dung, waste from trade and industry.

4. The process according to claim 3, wherein said alcohol-contaminated effluent contains 0.25-5 w-% alcohols.

5. The process according to claim 1, wherein said production of synthesis gas includes scrubbing and/or quenching of said synthesis gas with water to remove contaminants and/or to cool said synthesis gas, and wherein the resulting contaminated water is purified in said common waste water treatment process.

6. The process according to claim 5, wherein said contaminated water contains water-insoluble and water-soluble contaminants, including heavy or light tars, ammonium, alkali metals, chloride compounds, phosphorus compounds, as well as condensed water vapour.

7. The process according to claim 1, wherein pure water required in said biomass-to-liquid process and in said process for producing pulp and/or paper, respectively, is provided in a common ion exchange process.

8. The process according to claim 7, wherein said pure water is used for providing steam for each of said integrated processes.

9. The process according to claim 7, wherein said biomass-to-liquid process includes a water gas shift (WGS) reaction and wherein chemically pure water is provided to said WGS reaction from said common ion exchange process.

10. The process according to claim 7, wherein said pure water is used for the gasification and/or gas conditioning unit in the biomass-to-liquid process.

11. The process according to claim 1, wherein said biomass is gasified and a solid residue containing elemental carbon, soot and/or char is produced as a by-product of said gasification.

12. The process according to claim 11, wherein said solid residue or said elemental carbon or a part thereof is used for purifying a contaminated liquid and/or gaseous effluent of said biomass-to-liquid process or said process for producing pulp and/or paper.

13. The process according to claim 12, wherein an energy value of said solid residue/elemental carbon is increased by said purification process and it is mixed with combustible by-products of said pulp and/or paper process, for improving the combustion value of said combustible by-products.

14. The process according to claim 1, wherein high, medium and/or low pressure steam is provided in said biomass-to-liquid process and said steam is utilized as pressure steam, respectively, in said a pulp and/or paper process.

15. The process according to claim 1, wherein the resulting product of the Fischer-Tropsch process is separated into gaseous off gas and liquid fuel products and said gaseous off gas or part thereof is directed to said process for producing pulp and/or paper for combustion and energy production.

16. The process according to claim 1, wherein said pulp and/or paper process is operated to produce pulp and/or paper and said biomass-to-liquid process is operated to produce biofuel in the diesel and/or naphtha boiling range and said integrated process is optionally operated to provide surplus energy and/or chemicals.

* * * * *